(12) United States Patent
Liu et al.

(10) Patent No.: US 6,932,272 B1
(45) Date of Patent: Aug. 23, 2005

(54) MICRO BAR CODE AND RECOGNITION SYSTEM AND METHOD THEREOF

(75) Inventors: Yi-Pei Liu, Taipei (TW); Shen-Lung Lee, Taipei (TW); Tsui-Ching Shen, Taipei (TW)

(73) Assignee: Culture.Com Technology (Macau) Ltd., Macau (MO)

( * ) Notice: Subject to any disclaimer, the term of this patent is extended or adjusted under 35 U.S.C. 154(b) by 0 days.

(21) Appl. No.: 10/891,557

(22) Filed: Jul. 14, 2004

(51) Int. Cl.[7] .............................................. G06K 7/10
(52) U.S. Cl. ........................... 235/462.01; 235/462.02; 235/454
(58) Field of Search ...................... 238/462.01, 462.02, 238/454, 375, 416, 494; 235/435, 439

(56) References Cited

U.S. PATENT DOCUMENTS

| | | | | |
|---|---|---|---|---|
| 5,118,369 A | * | 6/1992 | Shamir | 156/64 |
| 5,129,974 A | * | 7/1992 | Aurenius | 156/64 |
| 5,380,993 A | * | 1/1995 | Komai | 235/462.01 |
| 5,907,144 A | * | 5/1999 | Poon et al. | 235/462.08 |
| 6,616,045 B2 | * | 9/2003 | Komai | 235/462.15 |
| 6,799,725 B1 | * | 10/2004 | Hess et al. | 235/462.01 |
| 2003/0085274 A1 | * | 5/2003 | Leaton et al. | 235/380 |
| 2003/0098357 A1 | * | 5/2003 | Cummings et al. | 235/494 |

* cited by examiner

*Primary Examiner*—Thien M. Le
*Assistant Examiner*—Edwyn Labaze
(74) *Attorney, Agent, or Firm*—Mikio Ishimaru

(57) ABSTRACT

A micro bar code and a recognition system and method thereof are provided. The micro bar code is provided with a plurality of nanounits disposed in a predetermined arrangement. The nanounits are provided with nanomolecules having different sizes respectively. In the recognition system and method, a sensing module senses the arrangement of the nanounits and the sizes of the nanomolecules on the micro bar code. The sensing result from the sensing module is transmitted to an operating module and then inputted to a bar code database that stores information corresponding to arrangement of each set of nanounits and sizes of each set of nanomolecules, so as to recognize the information on the micro bar code to be recognized. Finally, the recognition result is transmitted back to the operating module for recording. The micro bar code has advantages of small size and large data storage capacity.

20 Claims, 8 Drawing Sheets

MICRO BAR CODE AND RECOGNITION SYSTEM AND METHOD THEREOF

FIELD OF THE INVENTION

The present invention relates to micro bar codes and recognition systems and methods thereof, and more particularly, to a micro bar code for recognizing product information, and a recognition system and method of the same.

BACKGROUND OF THE INVENTION

A conventional bar code system for recognition of products utilizes the principle of different optical reflection rates to input digital signals into a computer by optical scanning so as to recognize product information. For example, a product code is scanned and converted by computer software to a selling price being previously entered, such that the price of the product to be purchased is entered and recorded.

Referring to the bar code recognition system 40 shown in FIGS. 5A and 5B, a bar code 41 comprises black and white stripes of different widths and is affixed to a product 42 to represent a product code for the product 42. A bar code reader 43 is used to scan the bar code 41, wherein a CCD sensor or light-emitting element 45 of the bar code reader 43 emits light on the black and white stripes of the bar code 41 such that the white stripes reflect visible light of different wavelengths and the black stripes absorb visible light of different wavelengths. Then a lens 46 of the bar code reader 43 focuses the reflected light on a photoelectric converter 47 that converts the reflected light signals to corresponding digital electrical signals. The digital electrical signals are transmitted via an amplifier circuit 48 and a shaping circuit 49 back to a central processor of a computer, such that the product code can be recognized by the central processor and previously installed software of the computer. Therefore, a user can rapidly associate a product code on a product with product information such as selling price, discount condition, stock supply condition, borrowed and returned deadlines in case for a book, and so on, by simply scanning the product code and entering the related information via the computer software.

However, the above conventional recognition technique is inherent with a significant problem that the recognition accuracy thereof is only 95%, which is not good enough in practice. Moreover, since the bar code 41 utilizes stripes of different widths to achieve the differentiation effect, the design of the bar code 41 is restricted in terms of a limitation on the possible number of stripes being provided within a unit area. Further, the size of bar code may be increased according to different widths of the stripes used for the bar code, and such bar code is not suitable for recognition of small products.

In recent years, there has been developed a radio frequency identification (RFID) recognition technique using radio waves to transmit product recognition information, in place of the conventional bar code technique. Referring to FIG. 6, a RFID chip 50 that can emit radio waves is packaged on a tag 51, and then the tag 51 is affixed to a product to be recognized. Upon activation, the radio waves emitted by the chip 50 are transmitted to a reader 53 via an antenna 52 and then transmitted via information middleware 54 to a distant integration system 55 where recognition and processing of the wave signals are performed.

The RFID recognition technique has advantages such as data updating, large data storage capacity, high recognition accuracy, high data security, and so on, which can solve some of the problems caused by the conventional bar code technique. However, the RFID recognition technique still leads to significant drawbacks. Liquids or metals would often interfere with transmission of the radio waves to cause failure, such that the variety of products to which the RFID recognition technique is applicable becomes limited. For example, with respect to refrigerated fresh food sold in general supermarkets, condensed vapors or water may appear on packages thereof and impede the recognition function of the RFID chip. Furthermore, the RFID recognition system requiring a special antenna and a reader is relatively complex, and it is rather difficult to achieve packaging accuracy between the chip, the tag, and the antenna. This makes the RFID recognition system not cost-effective to fabricate and not suitable for mass production.

Therefore, the problem to be solved here is to provide an improved bar code and a recognition system and method thereof, which can eliminate the foregoing prior-art drawbacks when recognizing products.

SUMMARY OF THE INVENTION

In light of the above prior-art drawbacks, a primary objective of the present invention is to provide a miniaturized micro bar code and a recognition system and method thereof.

Another objective of the present invention is to provide a micro bar code having high data storage capacity, and a recognition system and method thereof.

Still another objective of the present invention is to provide a micro bar code having high recognition accuracy, and a recognition system and method thereof.

A further objective of the present invention is to provide a micro bar code that is not interfered with by liquids, and a recognition system and method thereof.

A further objective of the present invention is to provide a low-cost micro bar code, and a recognition system and method thereof.

In accordance with the above and other objectives, the present invention proposes a micro bar code including: a body having a sensing area, and a plurality of nanounits disposed in the sensing area according to a predetermined arrangement, wherein each of the nanounits is provided with a nanomolecule, and the nanomolecules in the different nanounits have different sizes respectively.

The present invention also proposes a micro bar code recognition system. This system includes: a sensing module for sensing the arrangement of the nanounits and the sizes of the nanomolecules on the micro bar code; a transmitting module connected to the sensing module; an operating module for receiving the sensing result from the sensing module via the transmitting module; and a bar code database for storing information corresponding to arrangement of each set of nanounits and sizes of each set of nanomolecules, such that the operating module can input the sensing result from the sensing module to the bar code database so as to recognize the information on the micro bar code to be recognized, and the recognition result is transmitted back to the operating module for recording.

The present invention further proposes a micro bar code recognition method. This method includes the steps of: providing a micro bar code having a plurality of nanounits disposed thereon in a predetermined arrangement, wherein each of the nanounits is provided with a nanomolecule, and the nanomolecules in the different nanounits have different sizes respectively; providing a sensing module to sense the arrangement of the nanounits and the sizes of the nanomolecules on the micro bar code; transmitting the sensing result from the sensing module to an operating module via a transmitting module; inputting via the operating module the sensing result from the sensing module to a bar code database that stores information corresponding to arrangement of each set of nanounits and sizes of each set of nanomolecules, so as to recognize the information on the micro bar code to be recognized; and finally, transmitting the recognition result back to the operating module for recording.

The foregoing plurality of nanounits are evenly spaced and arranged in a row according to a predetermined sequence. Also, the different nanounits can be defined to represent different numbers such as 0, 1, 2, . . . and 9.

Moreover, the micro bar code recognition system and method further include a display module connected to the operating module and for displaying the recognition result recorded in the operating module. The sensing module can include an electromagnetic sensor for receiving electromagnetic waves emitted from the nanomolecules. Alternatively, the sensing module can include an optical sensor and a photoelectric converter. The optical sensor may emit light of high frequencies and short wavelengths for use to detect the arrangement of the nanomolecules, and the detected light signals are converted to digital electrical signals by the photoelectric converter prior to being transmitted to the operating module.

Therefore, the micro bar code and the recognition system and method thereof proposed in the present invention have advantages such as small size and large data storage capacity of the micro bar code, high recognition accuracy, and low cost. And the recognition process would not be interfered with by liquids. Thus, the drawbacks in the prior art can be eliminated.

BRIEF DESCRIPTION OF THE DRAWINGS

The present invention can be more fully understood by reading the following detailed description of the preferred embodiments, with reference made to the accompanying drawings, wherein.

DETAILED DESCRIPTION OF THE PREFERRED EMBODIMENTS

Figure 1A:
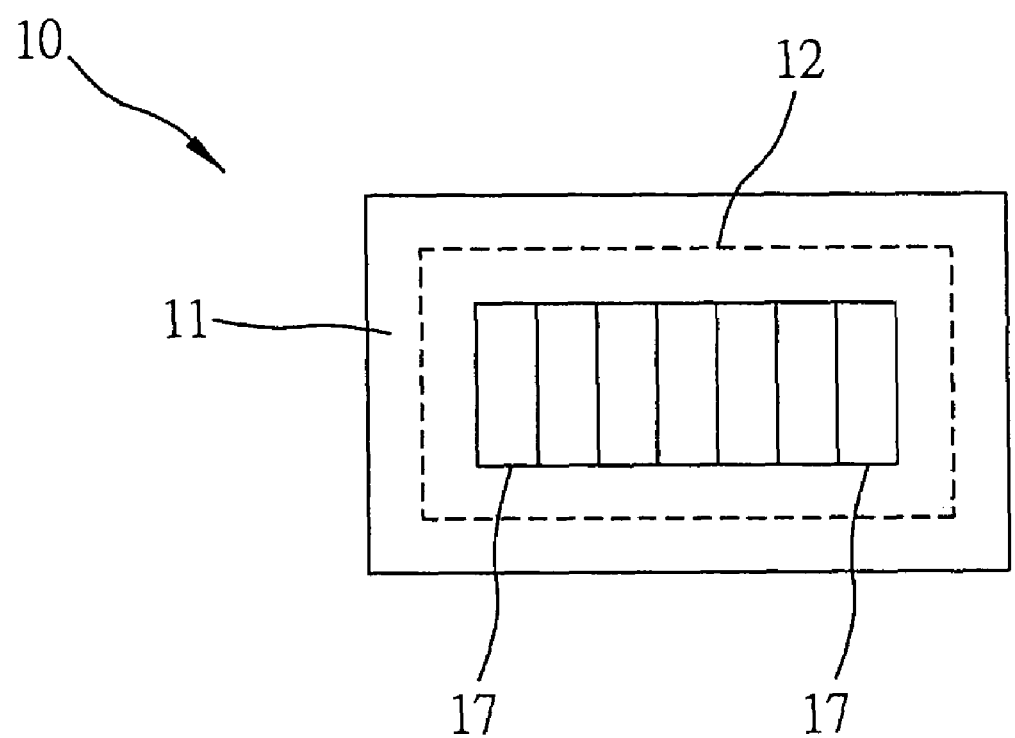
FIG. 1A is a schematic diagram of a micro bar code according to the present invention.
Figure 1B:
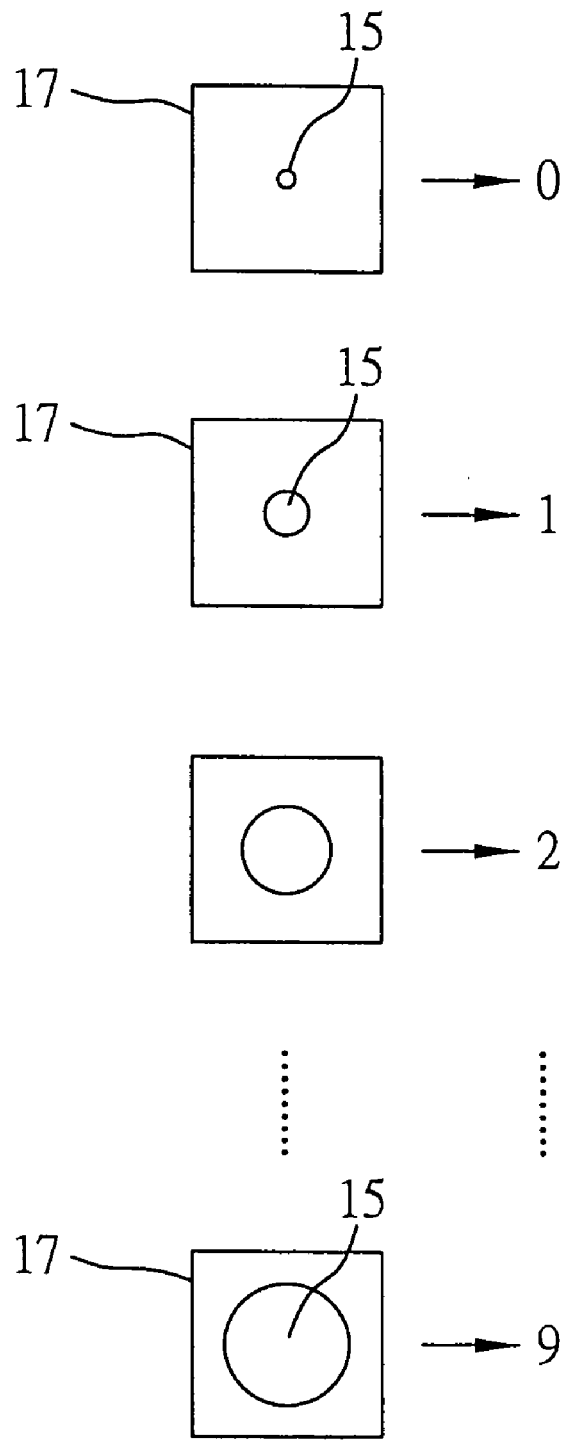
FIG. 1B is a schematic diagram showing an example of each nanounit of the micro bar code being defined to represent a number according to the present invention.

A micro bar code proposed in the present invention utilizes various arrangements of nanomolecules to achieve differences in recognition. Referring to the embodiment shown in FIG. 1A, a micro bar code 10 comprises a body 11, a sensing area 12 located approximately at the center of the body 11, and a plurality of nanounits 17 provided in the sensing area 12. The nanounits 17 are spaced evenly and arranged in a row according to a predetermined sequence depending on the kind of product to which the micro bar code 10 is to be affixed. Each of the nanounits 17 is provided with a magnetic nanomolecule 15, such that the nanounits 17 correspond to different numbers respectively according to different sizes of the nanomolecules 15 provided therein. Referring to FIG. 1B, for example, ten nanounits 17 having the nanomolecules 15 of different sizes may respectively represent numbers 0, 1, 2 . . . and 9. Thus, the sequence of the plurality of nanounits 17 can be arranged and defined to indicate the kind of product to which the micro bar code 10 is to be affixed, i.e. a recognition code of the product.

The micro bar code 10 has advantages of small size and large data storage capacity. Practically, the diameter of the smallest nanomolecule 15 is only around $10^{-9}$ m. Thus, if the sizes of ten nanomolecules 15 are selected progressively and increasingly by a factor of ¼ from the size of the smallest nanomolecule, the widths of corresponding nanounits 17 (respectively representing numbers 0 to 9) are only up to the level ranging from $10^{-7}$ to $10^{-9}$ m. For a general product bar code having a width of approximately from 2 to 3 cm, at least around $10^5$ nanounits 17 can be arranged in a single row of such bar code. Thus, the number of digits (the data capacity) to be recognized would be far greater than that of a conventional bar code comprising stripes of different widths (typically having only 10 to 15 digits), such that the drawback of the conventional bar code not having enough data capacity is eliminated through the use of the micro bar code 10.

Therefore, the micro bar code 10 proposed in the present invention is greatly reduced in size and thus can be applied to a miniaturized product as well as provides much more combinations of numbers or codes than the conventional bar code does. Since the relatively more combinations of numbers or codes are provided by this micro bar code 10, and the data capacity (the number of digits of the bar code) of the micro bar code 10 is far greater than that of the conventional bar code, product information such as a selling price and condition of stock supply can be directly encoded as numbers on the micro bar code 10 without the need to convert and retrieve the product information from a computer by software as for the conventional bar code. In other words, all product information can be included in the micro bar code 10 and can be obtained and inputted to a computer or cash register once it has been sensed, without the need to be looked up, read or converted. A user only has to update the product information using computer software when it is necessary (such as on a sale). This thus provides convenience in using the micro bar code 10 unlike the conventional bar code.

Furthermore, compared to the conventional radio frequency identification (RFID) recognition technique, the micro bar code 10 in the present invention needs not to integrate elements such as a chip, tag, and antenna, and thus can effectively reduce the cost thereof. Additionally, the information reading for the micro bar code 10 is performed by the theory of magnetics or optics, and unlike the RFID recognition technique, is not liable to failure due to interference of liquids. Thus, the micro bar code 10 is suitably applicable to the recognition of refrigerated fresh food packages having condensed vapors or water thereon, and the prior-art drawback is eliminated.

Figure 2:
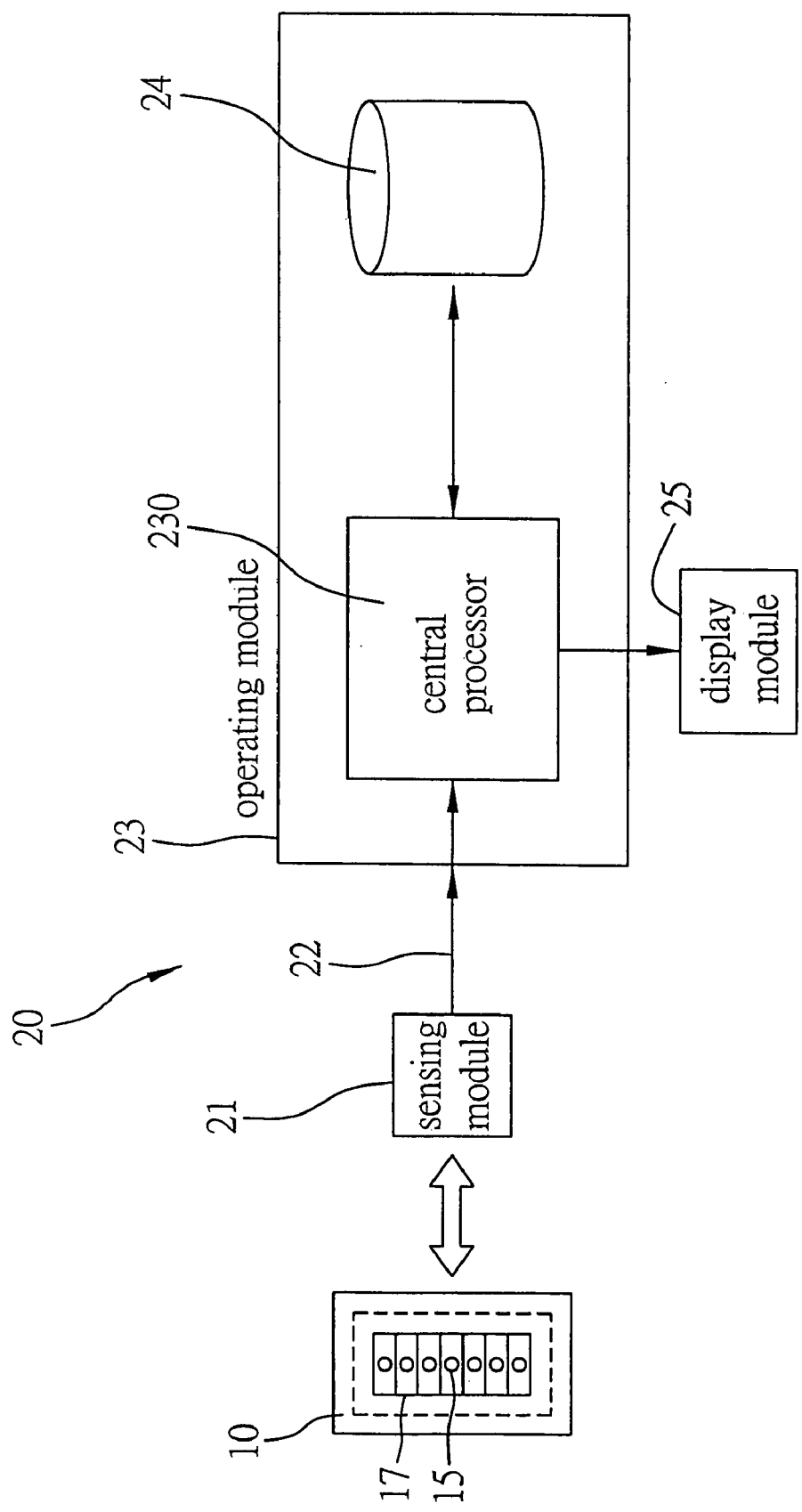
FIG. 2 is a schematic diagram of a micro bar code recognition system according to a preferred embodiment of the present invention.

Referring to FIG. 2, a micro bar code recognition system 20 proposed in the present invention for recognizing the micro bar code 10 comprises a sensing module 21, a transmitting module 22, and an operating module 23 such as a computer. The sensing module 21 is used to sense the arrangement of the nanounits 17 and the sizes of the nanomolecules 15 on the micro bar code 10. The sensing module 21 is connected to the operating module 23 via the transmitting module 22, such that the sensing result from the sensing module 21 for the micro bar code 10 can be transmitted to a central processor 230 of the operating module 23. Moreover, the operating module 23 further comprises a bar code database 24 where product information corresponding to arrangement of each set of nanounits 17 and sizes of each set of nanomolecules 15 is stored. As a result, the operating module 23 is able to input the sensing result (such as a product code) from the sensing module 21 to the bar code database 24 so as to recognize the detailed product information (such as a product price) on the micro bar code 10 to be recognized. Subsequently, the recognized product information is transmitted back to the central processor 230 of the operating module 23 for recording and is displayed on a display module 25 such as a screen to output the information of the micro bar code 10 recognized by the operating module 23.

The foregoing sensing module 21 can be an electromagnetic sensor for sensing electromagnetic waves emitted by the magnetic nanomolecules 15 on the micro bar code 10. Thus, the location and arrangement of the nanomolecules 15 can be recognized according to the electromagnetic waves, and can be transmitted to the central processor 230 of the operating module 23 via the transmitting module 22 after being converted to digital electrical signals, without having to perform extra scanning of the micro bar code 10. This provides convenience in recognizing the information of the bar code 10.

Alternatively, the foregoing sensing module 21 can be an optical sensor having a high frequency light-emitting unit for emitting light of high frequencies and short wavelengths. The light is used for scanning the micro bar code 10 to recognize the arrangement of the nanounits 17 and the sizes of the nanomolecules 15 on the sensing area 12 according to the reflected light. Subsequently, the reflected light signals are received and converted to digital electrical signals by a photoelectric converter of the sensing module 21 and transmitted to the central processor 230 of the operating module 23 by the transmitting module 22.

The data stored in the bar code database 24 can be pre-input purchase information of products or updated information inputted by sellers. After the sensed arrangement of the nanounits 17 and sizes of the nanomolecules 15 are transmitted to the central processor 230, a comparison is performed by the central processor 230 using the data stored in the bar code database 24 so as to allow numbers represented by the arrangement of the nanounits 17 and the sizes of the nanomolecules 15 to be converted to corresponding information stored in the bar code database 24. Then, the converted information is recorded by the central processor 230 and displayed on the display module 25. For example, a large amount of information such as product names, selling prices, suppliers, conditions of stock supply, discount conditions, inventory and sales, etc. can be recorded and displayed. Moreover, as the data capacity of the micro bar code 10 in the present invention is far larger than that of the conventional bar code, the product information of the micro bar code 10 converted through the bar code database 24 is also much more than that of the conventional bar code, such that the information recording and recognition are significantly improved by the present invention.

In addition, as described above, the micro bar code 10 proposed in the present invention has an advantage of large data storage capacity. Thus, initial information such as product names, selling prices and suppliers can be directly encoded as numbers on the bar code 10 without the need to be converted to any associated information stored in the bar code database 24. This can reduce occupation of the storage of the bar code database 24 and the operating load of the central processor 230. Such improvement is silent in and cannot be achieved by the prior art.

Figure 3:
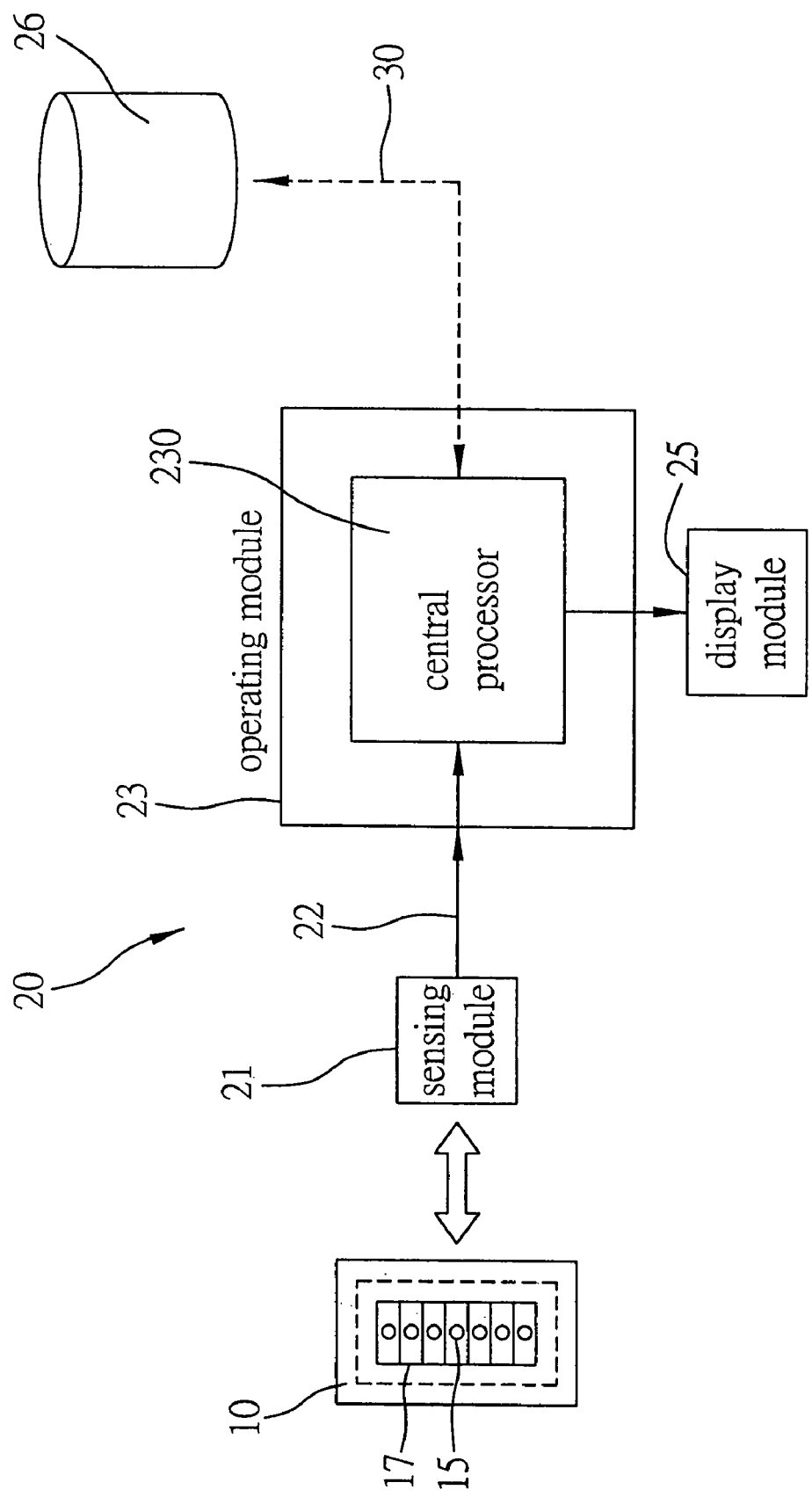
FIG. 3 is a schematic diagram of a micro bar code recognition system according to another preferred embodiment of the present invention.

Referring to FIG. 3, apart from the foregoing bar code database 24 being provided in the operating module 23 such as computer, the bar code database can be a distant bar code database 26 that is connected to the operating module 23 via the Internet 30, such that the stock suppliers and various selling locations can be simultaneously networked. Therefore, not only the converted and displayed information of the micro bar code 10 becomes more diverse and extensive, but also the information is capable of being immediately updated to further reduce the operating load of the central processor 230.

Figure 4:
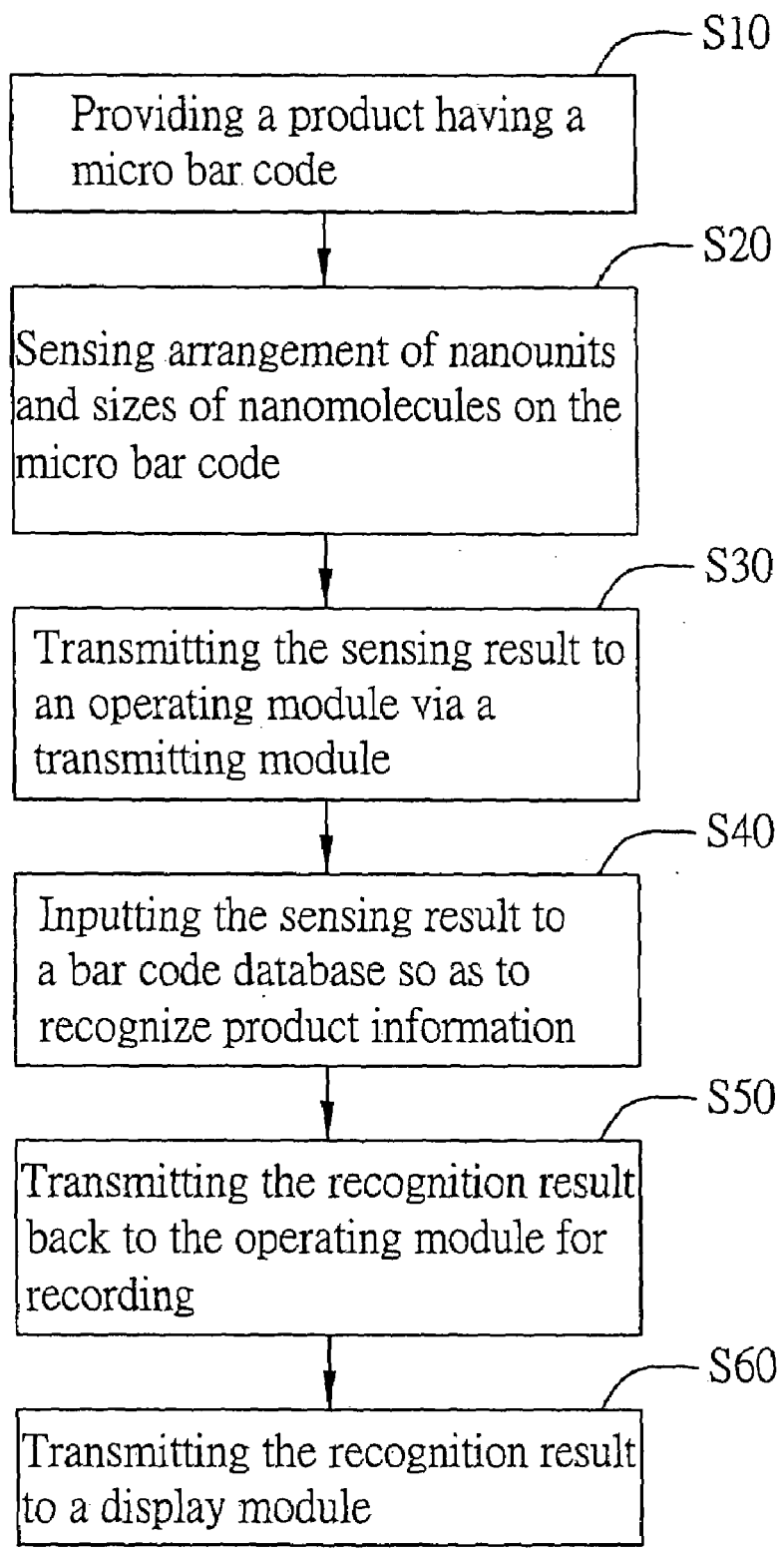
FIG. 4 is a flowchart of a micro bar code recognition method according to the present invention.
Figure 5A:
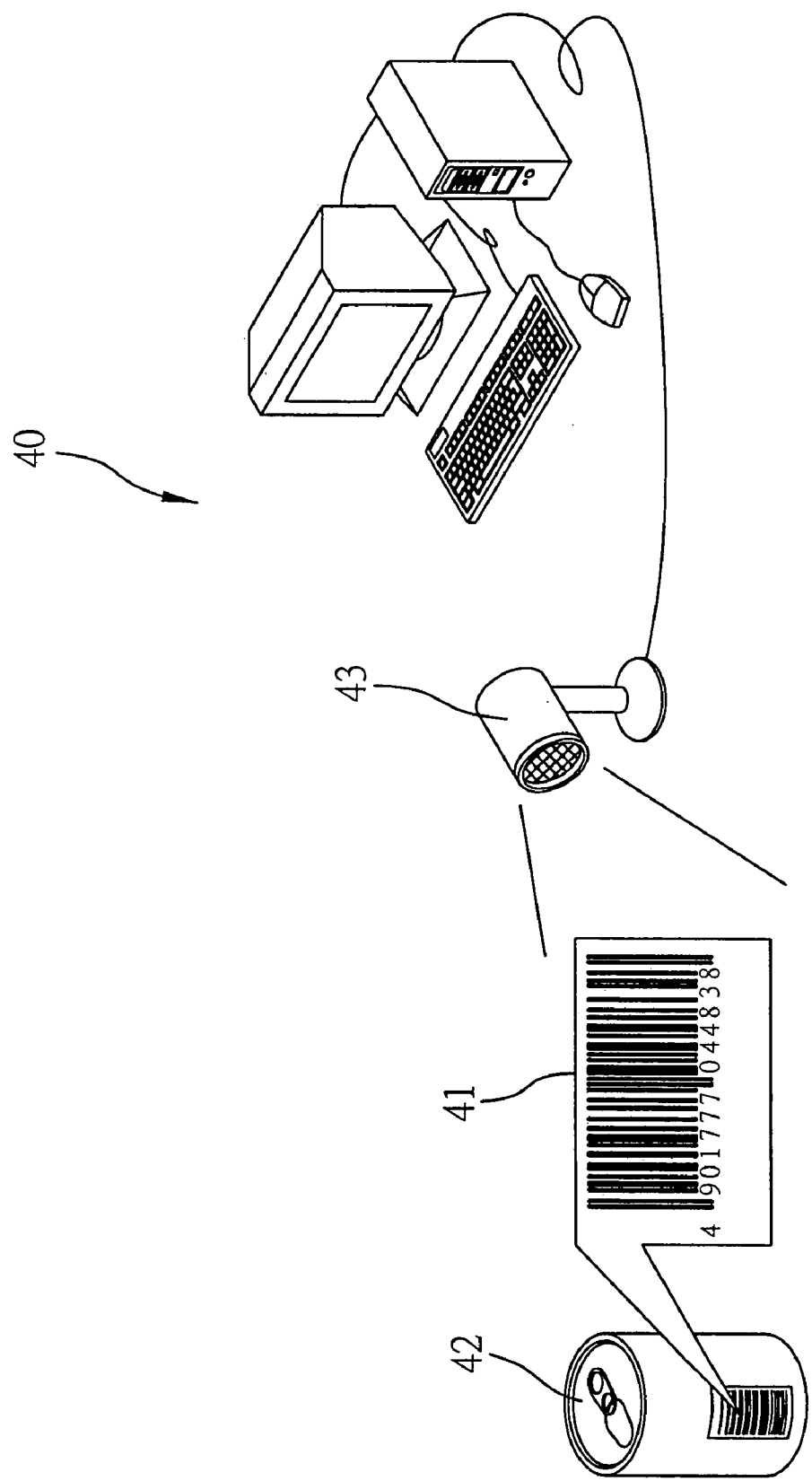
FIGS. 5A and 5B (PRIOR ART) are schematic diagrams of a conventional bar code recognition system.
Figure 5B:
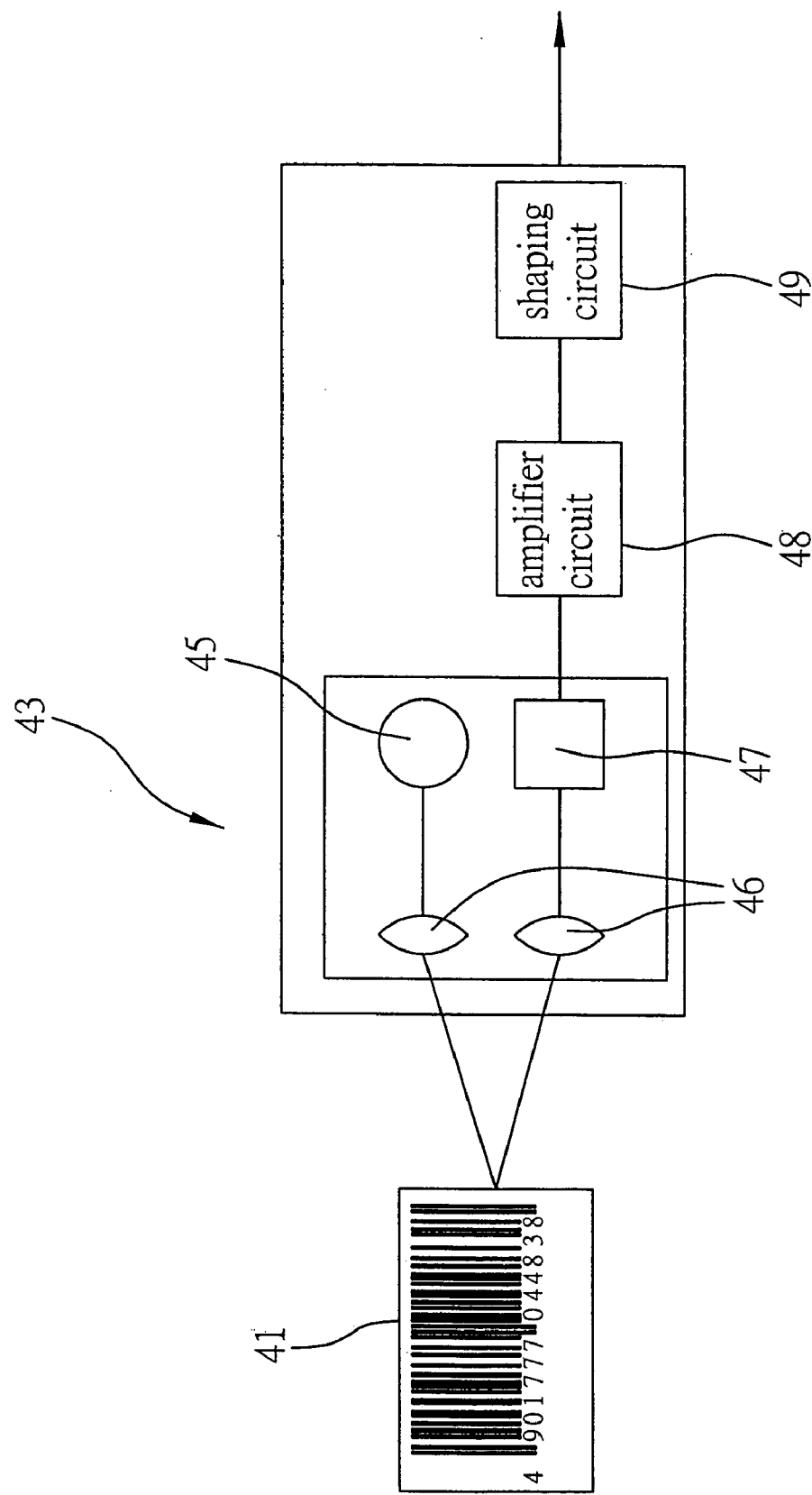
Figure 6:
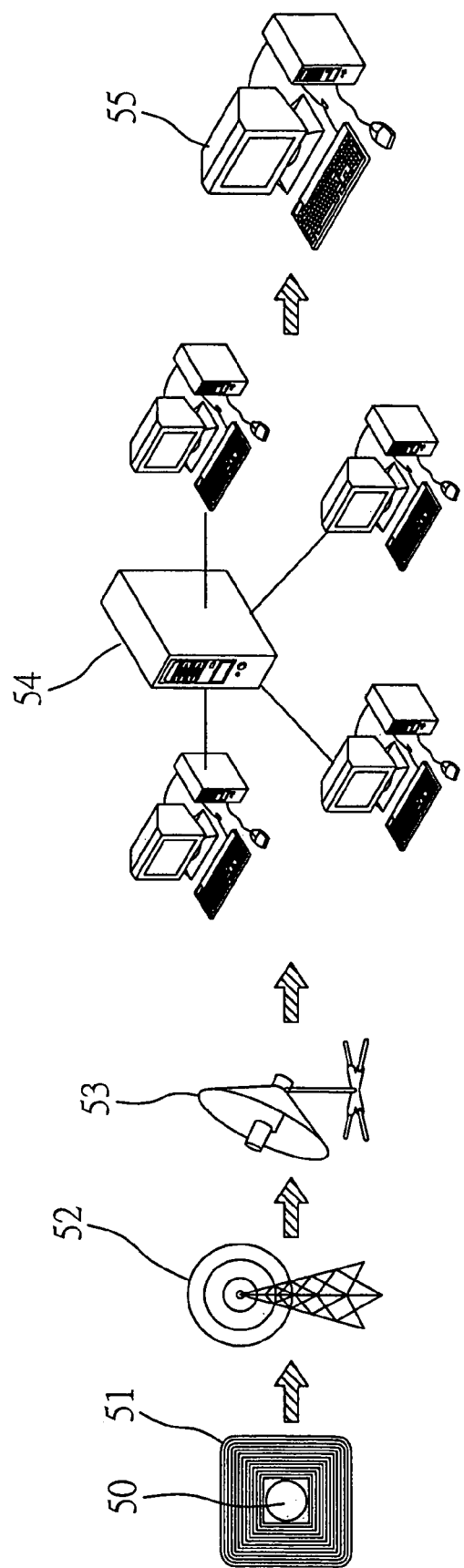
FIG. 6 (PRIOR ART) is a schematic diagram of a conventional radio frequency identification (RFID) recognition system.

FIG. 4 is a flowchart of a micro bar code recognition method according to the present invention. First, in Step S10, a product having a micro bar code 10 is provided. A plurality of nanounits 17 are disposed on the micro bar code 10 according to a predetermined arrangement, and a plurality of nanomolecules 15 of different sizes are provided on the nanounits 17 respectively. Next, in Step S20, a sensing module 21 such as an electromagnetic or optical sensor senses the arrangement of the nanounits 17 and the sizes of the nanomolecules 15 on the micro bar code 10. Then, in Step S30, the sensing result from the sensing module 21 is transmitted to a central processor 230 of an operating module 23 via a transmitting module 22. In Step S40, the sensing result from the sensing module 21 is inputted to a bar code database 24, 26 where information corresponding to arrangement of each set of nanounits 17 and sizes of each set of nanomolecules 15 is stored, so as to recognize the information of the micro bar code 10 to be recognized. The bar code database 24 can be installed in the operating module 23, or the bar code database 26 can be connected to the operating module 23 via the Internet 30. Subsequently, in Step S50, the recognition result is transmitted back to the operating module 23 for recording. Lastly, in Step S60, the recognition result is transmitted to a display module 25 connected to the operating module 23, such that the recognized information of the micro bar code 10 is displayed. This completes information recognition of the micro bar code 10 in the present invention.

Therefore, the micro bar code and the recognition system and method thereof proposed in the present invention have advantages such as small size and large data storage capacity of the micro bar code, high recognition accuracy, and low cost. And the recognition process would not be interfered with by liquids. Thus, the drawbacks in the prior art can be eliminated.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A micro bar code, comprising:
   a body comprising a sensing area; and
   a plurality of nanounits disposed in the sensing area of the body according to a predetermined arrangement, wherein each of the nanounits is provided with a nanomolecule, and the nanomolecules in different nanounits have different sizes respectively.

2. The micro bar code of claim 1, wherein the nanomolecules are magnetic nanomolecules.

3. The micro bar code of claim 1, wherein the nanounits are spaced evenly and arranged in a row according to a predetermined sequence.

4. The micro bar code of claim 1, wherein the different nanounits are respectively defined to represent different numbers.

5. A micro bar code recognition system for recognizing a micro bar code comprising a plurality of nanounits disposed in a predetermined arrangement, wherein each of the nanounits is provided with a nanomolecule, and the nanomolecules in different nanounits have different sizes respectively, the micro bar code recognition system comprising:
   a sensing module for sensing the arrangement of the nanounits and the sizes of the nanomolecules on the micro bar code;
   a transmitting module connected to the sensing module;
   an operating module for receiving the sensing result from the sensing module via the transmitting module; and
   a bar code database for storing information corresponding to arrangement of each set of nanounits and sizes of each set of nanomolecules, such that the sensing result from the sensing module is inputted to the bar code database by the operating module so as to recognize information on the micro bar code to be recognized, and the recognition result is transmitted back to the operating module for recording.

6. The micro bar code recognition system of claim 5, wherein the nanomolecules are magnetic nanomolecules.

7. The micro bar code recognition system of claim 5, further comprising a display module connected to the operating module and for displaying the recognition result recorded in the operating module.

8. The micro bar code recognition system of claim 5, wherein the bar code database is provided in the operating module.

9. The micro bar code recognition system of claim 5, wherein the bar code database is connected to the operating module via the Internet.

10. The micro bar code recognition system of claim 5, wherein the sensing module comprises an electromagnetic sensor for sensing electromagnetic waves emitted by the nanomolecules.

11. The micro bar code recognition system of claim 5, wherein the sensing module comprises an optical sensor and a photoelectric converter, and the optical sensor is capable of emitting light of high frequencies and short wavelengths.

12. The micro bar code recognition system of claim 5, wherein the sensing result from the sensing module is a product code, and the recognition result in the operating module is detailed product information.

13. A micro bar code recognition method, comprising the steps of:
   providing a micro bar code having a plurality of nanounits disposed thereon in a predetermined arrangement, wherein each of the nanounits is provided with a nanomolecule, and the nanomolecules in different nanounits have different sizes respectively;
   sensing the arrangement of the nanounits and the sizes of the nanomolecules on the micro bar code via a sensing module;
   transmitting the sensing result from the sensing module to an operating module via a transmitting module;
   inputting via the operating module the sensing result from the sensing module to a bar code database that stores information corresponding to arrangement of each set of nanounits and sizes of each set of nanomolecules, so as to recognize information on the micro bar code to be recognized; and
   transmitting the recognition result back to the operating module for recording.

14. The micro bar code recognition method of claim 13, wherein the nanomolecules are magnetic nanomolecules.

15. The micro bar code recognition method of claim 13, further comprising a step of transmitting the recognition result to a display module connected to the operating module, such that the recognized information on the micro bar code is displayed.

16. The micro bar code recognition method of claim 13, wherein the bar code database is provided in the operating module.

17. The micro bar code recognition method of claim 13, wherein the bar code database is connected to the operating module via the Internet.

18. The micro bar code recognition method of claim 13, wherein the sensing module comprises an electromagnetic sensor for sensing electromagnetic waves emitted by the nanomolecules.

19. The micro bar code recognition method of claim 13, wherein the sensing module comprises an optical sensor and a photoelectric converter, and the optical sensor is capable of emitting light of high frequencies and short wavelengths.

20. The micro bar code recognition method of claim 13, wherein the sensing result from the sensing module is a product code, and the recognition result in the operating module is detailed product information.

* * * * *